April 16, 1929.  L. G. SIMJIAN  1,709,598
POSE REFLECTING SYSTEM FOR PHOTOGRAPHIC APPARATUS
Filed Oct. 11, 1927
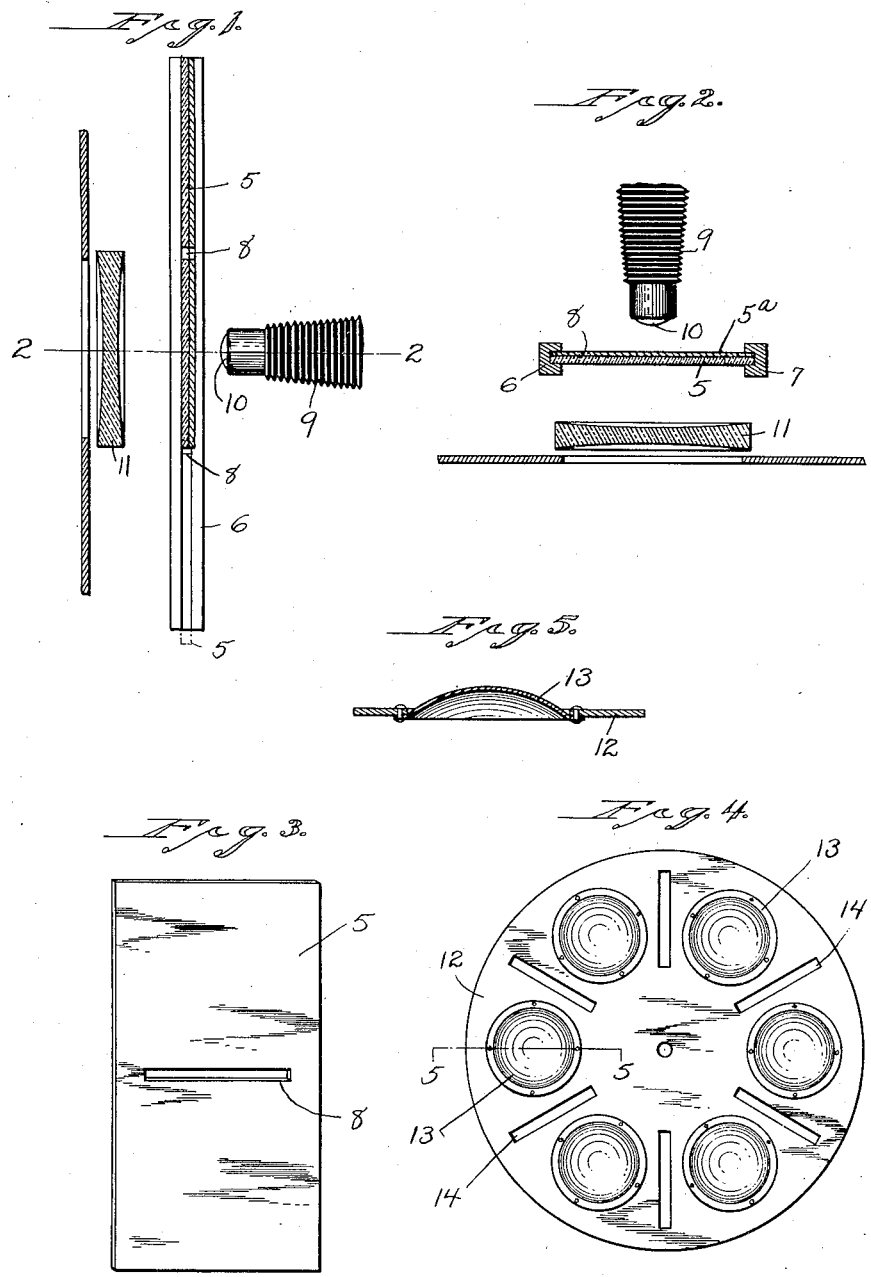

Patented Apr. 16, 1929.

1,709,598

UNITED STATES PATENT OFFICE.

LUTHER G. SIMJIAN, OF NEW HAVEN, CONNECTICUT.

POSE-REFLECTING SYSTEM FOR PHOTOGRAPHIC APPARATUS.

Application filed October 11, 1927. Serial No. 225,442.

This invention relates to an improvement in pose-reflecting systems for photographic apparatus, and particularly to photographic apparatus designed for use in automatic and semi-automatic photographic machines, though not so limited.

The object of this invention is to provide a simple and convenient pose-reflecting system for photographic apparatus which will enable a person being photographed to observe the image the camera will photograph, so that he may be guided in assuming a pose suitable to his tastes.

With this object in view, my invention consists in a pose-reflecting system for photographic apparatus characterized by a movable mirror-unit normally interposed between the subject and the sensitized material acted upon by a camera, so as to prevent the camera from recording the image of a person to be photographed and in which the said person may, beforehand, observe a reflection of the exact image which the said camera will record when the said mirror is moved from its normal or camera-obstructing position.

My invention further consists in a pose-reflecting system for photographic apparatus characterized as above and having provision for reducing the image reflected from said mirror to such proportions as to be readily observed or "taken in" at a glance.

In the accompanying drawings:

Fig. 1 is a schematic view in vertical section showing one form which my invention may assume;

Fig. 2 is a similar view in horizontal section, taken on the line 2—2 of Fig. 1;

Fig. 3 is a detached perspective view of the apertured mirror shown in Figs. 1 and 2; and Fig. 4 is a face view of another form which the mirror element may assume.

Fig. 5 is an enlarged-scale sectional view taken on the line 5—5 of Fig. 4.

In carrying out my invention as shown in Figs. 1, 2 and 3, I employ a rectangular mirror-unit 5 mounted for vertical sliding movement in a pair of guide-channels 6 and 7 respectively engaging its opposite edges and having a reflecting coating 5ª upon its rear face. About midway the length of the said mirror I form the same with an aperture 8 preferably rectangular in form, as shown in Fig. 3.

Directly back of the mirror 5 I locate a camera 9 of any approved type and requiring no detailed description. In front of the mirror and axially in line with the lens 10 of the camera I locate an image-reducing lens 11, commonly called a "minus" lens, which also may be of any approved type.

In the use of my improved photographic apparatus, the person being photographed positions himself in front of the lens 11 and mirror 5, so that he may see his reflection in the said mirror. Owing to the intervention of the reducing-lens 11 between himself and the mirror, the reflection which is seen by the sitter is reduced in size to such an extent that it may be readily "taken in" or observed at a glance.

While my invention is not so limited in its broad concept to the feature of reducing the size of the reflected image as just described, this feature is a valuable one and enables the person being photographed to see beforehand and at a glance the exact image which the camera 9 will record when the aperture of the mirror 5 is brought into registration with the lens 10, as will be hereinafter described. Without some means of reducing the size of the reflected image, the mirror must necessarily be of larger size, in order to reflect a full-sized image, from which it follows that the sitter must sweep a much larger area with his eyes, in order to ascertain the character of his pose.

After the sitter has satisfied himself as to the desirability of his pose as he sees it reflected upon a reduced scale in the mirror 5, the said mirror 5 is moved rapidly downward from the postion in which it is shown in full lines in Fig. 1, to the position in which it is shown by broken lines in the same figure by any suitable mechanism, or permitted to drop by gravity, if desired.

The downward movement of the mirror as just above described causes the aperture 8 therein to pass by the lens 10 of the camera and so permit the same to record the identical image which the sitter is at the time observing in the mirror 5.

Preferably, the surface of the mirror 5 is of a reflecting character both above and below the aperture 8 therein, though not necessarily so, so that, when the mirror is moved into its lower position, the sitter is unaware that the picture has been taken and is not, therefore, in the least startled, as is usually the case. The rapid passage of the aperture 8 back of the lens 11 is virtually unobserved, since it is, in itself, of small dimensions, and it is further reduced in apparent size by the reducing lens 11.

Instead of employing a reciprocating mirror 5, as shown in Figs. 1, 2 and 3, I may, if desired, employ a disk-like mirror-unit 12 to which step-by-step rotation may be imparted by any suitable mechanism. The mirror-unit just described mounts, as shown, six corresponding equidistant concave mirrors 13, and is pierced to provide a similar number of apertures 14 respectively located between the mirrors 13 aforesaid. Any approved means, such as an axial shaft, may be employed for guiding the mirror-unit 12 in its rotary or oscillating movement for alternately shielding and exposing the sensitized material in the camera.

By employing concave mirrors as shown in Fig. 4, the same act to reduce the image of the person being photographed in the same manner as the reducing-lens 11, which latter may, in this instance, be dispensed with.

I prefer to employ the reducing-lens 11, rather than the concave mirrors just above described, for the reason, among others, that the movement of the aperture is less perceptible when using the former and, therefore, less disturbing to the person being photographed, though I wish it understood that my invention is not limited thereto, nor is it, in fact, limited in its broad concept to the employment of any image-reducing means.

I have discovered that by interposing a minus or image-reducing lens between the camera and the person or subject to be photographed, a sharper and more distinct impression is recorded by the camera than would be the case if the minus lens were to be omitted. Furthermore, I have also found that this sharpness is not appreciably lessened by considerable variations in the distance between the person or object and the camera, so that in instances where the person to be photographed positions himself before the camera without the aid of the personal advice of an expert photographer, as is the case with automatic and semi-automatic photographic apparatus, uniformly satisfactory results may be obtained.

I claim:

1. In a pose-reflecting system for photographic apparatus, the combination with a camera and a lens-system thereof; of mirror-guiding means; a mirror-unit normally located in front of the said lens-system to prevent the image of a person to be photographed from being recorded by said camera, and movable under the guidance of the said mirror-guiding means from said normal position to permit the said image to be recorded by said camera; whereby a person to be photographed may, beforehand, observe an accurate reflection of the image which the said camera will record when the said mirror is moved from its normal position.

2. A pose-reflecting system for photographic apparatus as in claim 1, and having provision for reducing the image reflected from said mirror to such proportions as to be readily observed at a glance.

3. In a pose-reflecting system for photographic apparatus, the combination with a camera and the lens-system thereof; of a movable mirror-unit formed with an aperture and normally located in front of the said lens-system to prevent the image of a person to be photographed from being recorded by said camera; the said aperture in said mirror being movable therewith into registration with the said lens-system, so as to permit the said image to be recorded by the said camera through the said aperture; whereby a person to be photographed may, beforehand, accurately determine the pose which the said camera will record when the said aperture is moved into registration with the said lens-system.

4. A pose-reflecting system for photographic apparatus as in claim 3, and having provision for reducing the image reflected from said mirror to such proportions as to be readily observed at a glance.

5. In a pose-reflecting system for photographic apparatus, the combination with a camera and the lens-system thereof; of a mirror-unit normally located in front of the said lens-system to prevent the image of a person to be photographed fom being recorded by said camera, and movable from said normal position to permit the said image to be recorded by said camera; and an image-reducing lens located in front of the said mirror and the said lens-system; whereby a person to be photographed may, beforehand, observe a reduced-scale reflection of the image which the said camera will record when the said mirror is moved from its normal position.

6. In a pose-reflecting system for photographic apparatus, the combination with a camera and the lens-system thereof; of a mirror-unit formed with an aperture and normally located in front of said lens-system to prevent the image of a person to be photographed from being recorded by said camera; the said aperture in said mirror being movable therewith into registration with said lens-system so as to permit the said image to be recorded by the said camera through the said aperture; and an image-reducing lens located in front of the said mirror and the said lens-system; whereby a person to be photographed may, beforehand, observe a reduced-scale reflection of the image which the said camera will record when the said aperture is brought into registration with the said lens-system.

7. In a pose-reflecting system for photographic apparatus, the combination with a camera, of mirror-guiding means; a movable mirror-unit normally interposed between the sensitized material in the said camera and the subject to prevent the image of the said subject from being recorded by the said camera and movable under the guidance of the said mirror-guiding means from said normal position to permit the said image to be recorded by the said camera, whereby a person to be photographed may, beforehand, accurately determine by means of the said mirror the pose which the said camera will record when the said mirror is moved from its said normal position.

8. A pose-reflecting system for photographic apparatus, as in claim 7, and having provision for reducing the image reflected from said mirror to such proportions as to be readily observed at a glance.

9. In a pose-reflecting system for photographic apparatus, the combination with a camera, of a movable mirror-unit formed with an aperture and normally positioned to prevent the image of a person to be photographed from being recorded by said camera, the said aperture in said mirror being movable therewith, so as to permit the said image to be recorded through it by the said camera, whereby a person to be photographed may, beforehand, accurately determine by means of the said mirror, the pose which the said camera will record when the said aperture is moved into proper registration.

10. A pose-reflecting system for photographic apparatus, as in claim 9, and having provision for reducing the image reflected from the said mirror to such proportions as to be readily observed at a glance.

11. In a pose-reflecting system for photographic apparatus, the combination with a camera, of a mirror-unit normally positioned to prevent the image of a person to be photographed from being recorded by said camera and movable from said normal position to permit the said image to be recorded by said camera; and an image-reducing lens located in front of the said mirror; whereby a person to be photographed may, beforehand, observe in the said mirror a reduced-scale reflection of the image which the said camera will record when the said mirror is moved from its said normal position.

12. In a pose-reflecting system for photographic apparatus, the combination with a camera, of a mirror-unit formed with an aperture and normally positioned to prevent the image of a person to be photographed from being recorded by said camera, the said aperture in said mirror being movable therewith, so as to permit the said image to be recorded through it by said camera, and an image-reducing lens located in front of the said mirror, whereby a person to be photographed may, beforehand, observe in the mirror a reduced-scale reflection of the image which the said camera will record when the said aperture is brought into proper registration.

In testimony whereof, I have signed this specification.

LUTHER G. SIMJIAN.